United States Patent Office 3,496,279
Patented Feb. 17, 1970

3,496,279
MOSQUITO CONTROL OIL
Gilbert V. Chambers, Baytown, Tex., assignor to Esso Research and Engineering Company
No Drawing. Filed Apr. 26, 1967, Ser. No. 633,692
Int. Cl. A01n 9/04
U.S. Cl. 424—356                    4 Claims

ABSTRACT OF THE DISCLOSURE

Proliferation of mosquitoes is controlled by applying to the surface of breeding ponds at a rate from 1 to 10 gallons per acre an oil having larvicidal and pupicidal activity, said oil being a highly paraffinic mixture of compounds boiling in the range from 525° F. to 730° F., and having a 50% point not less than 570° F. and not more than 650° F. (ASTM–D86). The mixture is predominantly compounds of the formulae:

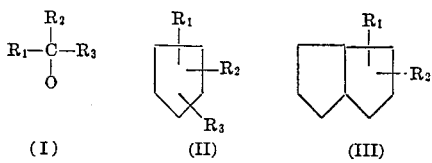

wherein $R_1$, $R_2$ and $R_3$ are highly branched paraffinic substituents and the total number of carbon atoms in each compound is from $C_{18}$ to $C_{28}$, preferably $C_{20}$ to $C_{25}$. The relative abundance of the compound types is roughly 0.1 (I), 0.6 (II) and 1.0 (III). Based on the bicyclo type, the occurrence may be expressed as a "bicyclo ratio" of 0.1 for type (I) and 0.6 for type (II). The branchiness ratio of the mixture is at least 2.4, preferably at least 2.6.

The use of high-boiling materials enhances residual toxicity, but at a 50% point above 650° F. a drastic decrease in toxicity is suffered, particularly if substantial amounts of 730° F.+ materials are present in the mixture.

CROSS-REFERENCE TO RELATED APPLICATION

This application contains subject matter which is related to subject matter disclosed and claimed in Ser. No. 604,790, filed by the same inventor on Dec. 27, 1966, now abandoned.

BACKGROUND OF THE INVENTION

Field of the invention

The present invention is directed to a novel and very effective hydrocarbon oil for use in killing the aquatic stages of insect life, particularly mosquitoes, and to a method of using the oil for that purpose. The oil of the present invention is particularly toxic to mosquito pupae, and is highly toxic to the ova and larvae as well.

The novel oil of the present invention is a high-boiling (preferably 550° F.–700° F.), highly branched paraffinic mixture, suitably obtained by acid-catalyzed alkylation reaction of isobutane and $C_3$ to $C_5$ α-olefins, as will be spelled out more specifically hereinafter.

The efficacy of mosquito control as a means for reducing the incidence of disease has long been recognized. Since the adult mosquito has a greater (though limited) mobility than the aquatic stages, the practical approach has been to attack the mosquito in its breeding grounds, killing the aquatic stages as well as the adult mosquitoes in the area.

Effective mosquito control requires a break in the "life cycle" that is, a substantially complete eradication of the mosquito population of a given area so that that proliferation by newly laid eggs can be avoided. This can be accomplished by killing the mosquito in its aquatic stages as successive egg hatchings occur and the aquatic stages begin to develop.

In general, the life cycle of the mosquito has the following timing. Eggs are laid on or near the water surface and hatch into larvae in about two to three days. The mosquito stays in the larval stage for about seven days, during which the larvae grow through several molting stages. (The periods between successive molts are referred to as "instars.") After passing through the larval stage, the mosquitoes become pupae and remain in that stage for about two days before emerging as adult mosquitoes.

There are 1400 species of mosquitoes, some 138 species occurring in North America alone. The most common mosquitoes in North America are the genera Aedes (61 species), Culex (27 species) and Anopheles (14 species). The effectiveness of any mosquito control oil will vary according to the genera and species being attacked, since the aquatic habits may vary. In all cases, however, an attack on the aquatic stages has been found to be most effective in proliferation control.

Description of the prior art

The use of hydrocarbon oils (generally) in proliferation control is not new. However, the diesel oil which has commonly been employed is ineffective unless used at high-dosage rates (e.g., greater than ten gallons per acre) and has been employed at a rate of about twenty gallons per acre in order to ensure effectiveness. This has been expensive both in the cost of materials used and the cost of transporting the large volumes of oil into the breeding areas.

SUMMARY OF THE INVENTION

A highly branched paraffinic oil mixture, preferably obtained by alkylation of isobutane with $C_3$ to $C_5$ α-olefins, has been found to be a superior mosquito control oil. It has toxicity both to larvae and pupae.

The oil of the present invention boils within the range from 525° F. to 730° F. and has a midpoint from 575° F. to 650° F., all as determined by ASTM–D86 distillation.

The mixture is predominantly compounds of the formulae:

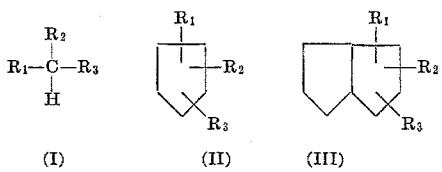

(I) (II) (III)

wherein $R_1$, $R_2$ and $R_3$ are highly branched paraffinic substituents and the total number of carbon atoms in each compound is $C_{18}$ to $C_{28}$, preferably $C_{20}$ to $C_{25}$. The branchiness ratio of the mixture is at least 2.4, preferably at least 2.6.

The mixture is applied to the surface of breeding ponds at a rate from 1 to 10 gallons per acre of pond surface.

DESCRIPTION OF THE PREFERRED EMBODIMENTS

The present invention provides an oil which can be used effectively in small quantities (as low as one gallon per acre). The oil is particularly effective against pupae, which spend a substantial part of the time as the water surface. It is effective in controlling all mosquito genera, exemplified by *Culex fatigans*, a mosquito commonly found throughout the world.

The oil of the present invention is a highly branched paraffinic mixture, suitably obtained by the acid-catalyzed alkylation of isobutane with a $C_3$ to $C_5$ $\alpha$-olefin. The oil has an ASTM-D86 boiling range of 525° F. to 730° F., with at least 50% of the oil boiling above 575° F. but not higher than about 650° F. Preferably, the oil will have an ASTM-D86 50% point of about 610° F. ±25° F.

It is necessary that the oil have a high boiling range for two reasons. First, toxicity of the material seems to depend on an inclusion of substantial quantities of the high-boiling material (575° F. to 635° F.) and, second, the lower-boiling material evaporates from the surface of the water before the mosquito life cycle can be broken.

The present invention employs an oil with a high "branchiness ratio." The "branchiness ratio" represents the ratio of the number of hydrogen atoms in $—CH_3$ groups to the number of hydrogen atoms in $—CH_2—$ groups. For example, a simple hydrocarbon such as propane ($H_3C—CH_2—CH_3$) would have a branchiness ratio of 6:2 (or 3.0). In the complex hydrocarbons of the present invention, a ratio of 3.0 requires two $—CH_3$ groups for each $—CH_2—$ group, as in propane, but in a much more complicated structure. The present oil is predominantly an admixture of hydrocarbons having the following general formulae:

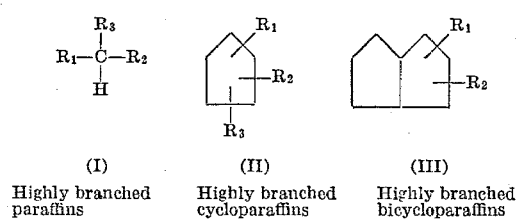

(I) Highly branched paraffins
(II) Highly branched cycloparaffins
(III) Highly branched bicycloparaffins wherein $R_1$, $R_2$ and $R_3$ are highly branched paraffinic substituents and wherein the total number of carbon atoms in the compounds is within the range from $C_{18}$ to $C_{28}$, with a preferred range of $C_{20}$ to $C_{25}$. The relative amounts of the three basic structures in decreasing order of abundance are bicycloparaffins, cycloparaffins and paraffins. The ratio of cycloparaffins (II) to bicycloparaffins (III) as determined by mass spectrographic techniques is about 0.6, although it can range from 0.45 to 0.84. The ratio of (I) to (III) is less than 0.2, generally is less than 0.1.

The branchiness ratio of the admixture, determined by nuclear magnetic resonance (NMR), is greater than 2.4 (and has been seen to be as high as 3.9) but preferably is greater than 2.6.

It has been found that the oils of the present invention have an API gravity from 34.0 to 42.6, preferably about 36 to 40. Olefins and aromatic hydrocarbons, which may be produced along with the paraffinic materials of the present invention, have no deleterious effect on the pupicidal or larvicidal activity, but do not appear to contribute thereto and may be eliminated (e.g., by mild hydrotreating) if desired.

The oil may be used by applying it in effective quantities to the surface of the water which serves as a breeding place. The application rate may be varied from one gallon per acre of water surface to a practical upper limit of about 10 gallons per acre (where weather conditions, such as wind and heat, might require a high dosage to offset evaporation losses). Usually, the dosage rate will vary from 2.5 to 5 gallons per acre. Treatment of a given breeding ground may be repeated at weekly intervals to maintain effective control if the location continues as a breeding site.

EXAMPLES

Applicant has collected relevant data on various oils. The oils of Example 1 to 17 disclosed hereinafter were obtained by the alkylation reaction of isobutane with $C_3$ to $C_5$ olefins, using a 96-88 weight percent aqueous sulfuric acid catalyst (acid strength decreases during each run). The feed ratio of isobutane to olefins was about 8, the reaction temperature about 40° F. to 60° F., at a reaction pressure of about 15 p.s.i.g., and a space velocity of about 0.1 volume of olefin per volume of acid per hour. The product of the alkylation reaction was fractionated and the high-boiling portion separated from the low boiling portion (425° F. and lower). Samples in the lower boiling range are shown for comparison purposes in Examples 1 to 5, Table I. Products recovered from commercial units were further fractionated to obtain separate oils of different boiling ranges (carbon number ranges). The fractionated cuts are shown in Table I as Examples 6 through 17. Diesel oils boiling in the same general range are also shown in Table I as Examples 18 through 21, for purposes of comparison with the highly branched oils of the present invention.

In Table I, the 24-hour mortality rates for the *C. fatigans* larvae and pupae were determined as follows.

Beakers (400 ml. capacity and 7.4 cm. internal diameter) containing 250 ml. of distilled water were used for all tests of laboratory strains. The laboratory specimens to be treated were selected at random from pools of larvae or pupae representing combined rearing pans. Twenty-five pupae or fourth instar larvae were used per beaker. Untreated and diesel oil controls were included in each test.

To test toxicity, the larvae or pupae were placed in each beaker, following which 0.01, 0.02, or 0.04 ml. of oil was dropped on the surface of the water with a pipette. These quantities represent a rate of 2.5 gallons per acre, 5.0 gallons per acre, and 10.0 gallons per acre, respectively. In those cases utilizing different rates, the amount of oil was proportionately changed. Twenty-four hours after the oil was introduced onto the surface of the water, the number of living and dead specimens was recorded and the percent mortality determined. This test was conducted in triplicate, with 25 specimens being used per replicate. In some of the reported examples (where such data was available) six replicates were averaged instead of three.

TABLE I

| Example Number | 1 | 2 | 3 | 4 | 5 | 6 | 7 | 8 | 9 | 10 | 11 |
|---|---|---|---|---|---|---|---|---|---|---|---|
| Lab Control Number | 2929 | 2930 | 2931 | 2932 | 2933 | 2994 | 2995 | 2996 | 2997 | 3840-13 | -14 |
| Distillation ASTM-D86: | | | | | | | | | | | |
| IBP | 206 | 247 | 326 | 348 | 380 | 423 | 509 | 540 | 571 | 518 | 558 |
| 5% | 207 | 249 | 329 | 352 | 383 | 437 | 520 | 555 | 591 | 548 | 566 |
| 50% | 210 | 253 | 335 | 358 | 388 | 473 | 553 | 579 | 615 | 552 | 571 |
| 95% | 214 | 277 | 349 | 369 | | 640 | 659 | 670 | 683 | 558 | 577 |
| FBP | 245 | | | 379 | 427 | 648 | 662 | 674 | 683 | 564 | 583 |
| Olefins, wt. percent | 0.018 | 0.024 | 0.034 | 0.034 | 0.000 | | | | | | |
| Aromatics, wt. percent | 0 | 0.004 | 0.005 | 0.001 | 0.021 | | | | | | |
| Branchiness Ratio [1] | | | | | | 2.63 | 3.33 | 3.65 | 3.17 | 2.87 | 2.86 |
| Bicyclo Ratio [2] | | | | | | | | 0.55 | 0.45 | 0.84 | 0.84 |
| API Gravity | 71.1 | 64.7 | 52.8 | 55.6 | 53.0 | 45.1 | 40.0 | 38.6 | 36.5 | 41.5 | 40.4 |
| Percent Mortality (*Culex fatigans*, 24 hours): | | | | | | | | | | | |
| Treat, gal./acre | 5.0 | 5.0 | 5.0 | 5.0 | 5.0 | 2.5 | 2.5 | 2.5 | 2.5 | 2.5 | 2.5 |
| Larvae | 29 | 7 | 31 | 28 | 31 | 10 | 40 | 62 | 85 | 39 | 60 |
| Pupae | 11 | 8 | 79 | 25 | 100 | 89 | 99 | 100 | 100 | 99 | 100 |
| Treat, gal./acre | | | | | | | | | | 1.25 | 1.25 | 1.25 |
| Pupae | | | | | | | | | | 96 | 99 | 92 |

| Example Number | 12 | 13 | 14 | 15 | 16 | 17 | 18 | 19 | 20 | 21 |
|---|---|---|---|---|---|---|---|---|---|---|
| Lab Control Number | 3840-15 | -16 | -15+-16 | -17 | 2954-1 | 2958-1 | 3811 | 3812 | 3809 | 3810 |
| Distillation ASTM-D86: | | | | | | | | | | |
| IBP | 588 | 600 | 588 | | [3] 550 | [3] 614 | 375 | 503 | 503 | 575 |
| 5% | 591 | 617 | 592 | 626 | 570 | | 389 | 507 | 522 | 580 |
| 50% | 594 | 623 | 608 | 651 | 635 | | 442 | 531 | 547 | 594 |
| 95% | 604 | 642 | 632 | 725 | 755 | | 471 | 568 | 613 | 620 |
| FBP | 608 | 645 | 645 | 730+ | 790 | 642 | 477 | 575 | 620 | 655 |
| Olefins, wt. percent | | | | | Tr. | Tr. | | | | |
| Aromatics, wt. percent | | | | | 0 | 0 | 21 | | 21 | 18 |
| Branchiness Ratio [1] | 2.85 | 3.26 | 3.06 | 2.46 | 3.51 | 3.90 | | | 0.54 | 0.44 |
| Bicyclo Ratio [2] | 0.72 | 0.60 | 0.66 | 0.57 | 0.78 | 0.50 | | | | |
| API Gravity | 39.3 | 38.1 | 38.7 | 34.0 | 37.7 | 38.9 | 36.7 | 35.0 | 34.8 | 35.6 |
| Percent Mortality (*Culex fatigans*, 24 hours): | | | | | | | | | | |
| Treat, gal./acre | 2.5 | 2.5 | 2.5 | 2.5 | 2.5 | 2.5 | 2.5 | 2.5 | 2.5 | 2.5 |
| Larvae | 79 | 76 | 80 | 7 | 72 | 89 | 16 | 42 | 43 | 52 |
| Pupae | 100 | 100 | 100 | 81 | 100 | 96 | | | 52 | 49 |
| Treat, gal./acre | 1.25 | 1.25 | 1.25 | 1.25 | 1.25 | 1.25 | | | | |
| Pupae | 96 | 93 | 95 | 1 | 75 | 89 | | | | |

[1] Determined by NMR, the ratio of $CH_3$ hydrogen atoms in the composition to $CH_2$ hydrogen atoms in the composition.

[2] Determined by mass spectrographic techniques, the ratio of monocyclocompounds to bicyclocompounds.

[3] 15 Plate (equiv.) distillation, not ASTM-D86 (single plate equiv.). Temperatures are higher than D86, particularly 95% point and FBP.

COMMENTS

Examples 1–5 show poor performance of low-boiling alkylate fractions, even at a treat rate of 5.0 gal./acre.

Examples 6–9 show increase in activity as IBP and 50% point increase. FBP should be identical, but D86 method is inaccurate for this purpose.

Examples 10–15 show that around 600° F. 50% point is optimum; after 650° F. midpoint, activity rapidly declines.

Examples 16–17 show that effectiveness is not due to olefins or aromatics.

Examples 18–21 show poor activity of diesel fuel in same boiling ranges.

Referring now to Table I, it is first noted that in Examples 1 through 5 low-boiling alkylate materials show a very poor performance even at a treat rate of 5 gallons per acre, particularly with respect to the *C. fatigans* larvae. The highest boiling fraction is shown in Example 5, which had an initial boiling point of 380° F., a 50% point of 388° F., and a final boiling point of 427° F. This oil, at a treat rate of 5.0 gallons per acre, had a 24-hour mortality effectiveness of only 31% for larvae, although it had 100% mortality rate for the pupae. Note that in Examples 1 and 2, the lowest boiling fractions in the range under consideration showed very poor activity with respect both to larvae and pupae.

It should be understood that, in dealing with living animals as test species, a certain amount of variability is encountered due to the varying susceptibility of individual experimental animals within the population used in one test as compared to those used in another. For the purposes of the work done, a very large number of similar runs have been made and general trends noted. The examples which have been selected are shown as exemplary of the directional trends which have been encountered and, although directionally consistent when considered as a part of the large research program, cannot be precisely quantitatively compared (i.e., a mortality rate of 62% is substantially the same as a rate of 60%, even with said replicates). Thus, Examples 1 and 2 are within the experimental error in the mortality rate of the pupae, but with respect to larvae, a directional significance can be given to the difference in larvae mortality. This directional superiority of the low-boiling fraction of Example 1 as compared to Example 2 is felt to be a real difference, which has been noted in a number of cases, although it cannot be explained.

Referring to Examples 6 through 9, it is seen that an increase in the toxicological activity is obtained by raising the initial boiling point and the 50% point of the highly branched paraffinic oils. The larvae toxicity increases from 10 to 40 to 62 to 85 as the initial boiling point is raised from 423 to 509 to 540 to 571° F. and the 50% point from 473 to 553 to 579 to 615° F.

Referring now to Examples 10 through 15, it is seen that an increase in the 50% point up to about 610° F. provides an increase in the activity of the material, but that after reaching this value, the activity is not appreciably increased by raising of the midpoint, and in fact at about 650° F., the activity declines for both larvae and pupae, especially evident at low treat rates (e.g., 1.25 gal./acre). For midpoints above 650° F., the activity appears to decline rapidly. It has been noted that increases in the amount of material boiling above 700° F. do not appear to provide any beneficial results. Fractions boiling exclusively above 700° F. have been found to have many poor toxicological activity.

Referring now to Examples 16 and 17, note that the oil in each case has no aromatic hydrocarbons and a very small amount of olefins. The high toxicological activity of these oils shows that the activity of the oils of the present invention is not due to olefins or aromatics which may be present therein.

Examples 18 to 21 are provided as a comparison of diesel fuels with the oils of the present invention. Note that Example 20 is very close to the oils of the present invention and shows an activity of only 43% for larvae and 52% for pupae. The higher boiling diesel fuel shown in Example 21 falls squarely within the boiling range of the present invention and is generally comparable in boiling range to the oil shown in Example 9. Note that this diesel fuel has an activity of only 52% for larvae as compared to 85% for the oil in Example 9 and the toxicity toward pupae is only 49% as compared to 100% for the oil of Example 9 at the same treat rate and 96% at half the treat rate of Example 21. This shows the significantly greater toxicological activity of the oils of the present invention.

The oils of the present invention differ from other cycloparaffins and bicycloparaffins in the degree of branchiness (branchiness ratio) of the substituents on the rings or carbon atoms in the central structure. Cycloparaffins with a branchiness ratio of less than 2.0 were prepared for purposes of comparison. These oils were prepared by the phosphoric acid catalyzed polymerization of propylene, and contain a carbon number distribution (boiling range) and structure similar to the cyclo- and bicycloparaffins in the oils of the present invention.

Six exemplary oils (Examples 22–27) were used in the same manner as set forth in the discussion of Table I in order to obtain comparative data. This data is shown in Table II.

TABLE II

| Example Number | 22 | 23 | 24 | 25 | 26 | 27 |
|---|---|---|---|---|---|---|
| Lab Control Number | 3826-7 | -8 | -9 | -10 | -11 | -12 |
| Distillation: | | | | | | |
| IBP* | 525 | 540 | 566 | 587 | 596 | 643 |
| FBP* | 540 | 566 | 587 | 596 | 643 | 724 |
| API Gravity | 40.3 | 39.8 | 39.3 | 38.5 | 36.5 | 22.6 |
| Branchiness ratio | 1.66 | 1.78 | 1.65 | 1.49 | 1.34 | 0.91 |
| Bicyclo ratio | 0.78 | 0.78 | | 0.87 | 0.91 | 0.61 |
| Percent Mortality, *Culex fatigans*, 24-hour exposure: | | | | | | |
| Larvae at 2.5 gal./acre treat rate | 23 | 12 | 20 | 27 | 27 | 0 |
| Pupae at 2.5 gal./acre treat rate | 92 | 95 | 83 | 93 | 47 | 24 |
| Pupae at 1.25 gal./acre treat rate | 40 | 71 | 76 | 74 | | |

*15 Plate distillation data.

The six oils shown in Table II are similar in having a branchiness ratio of less than 2.0. Concurrently, they are similar in having very poor activity against larvae at the treat rate of 2.5 gallons per acre. Some of the materials show a fairly good mortality activity against pupae at 2.5 gallons per acre, but at a treat rate of 1.25 gallons per acre it has been found that this activity also is very poor, while the activity of the claimed composition is still good at 1.25 gallons per acre.

As a comparison of the effect on branchiness ratio on the activity of the oil, a comparison of Example 25 with Example 12 shows that, for two oils of substantially the same general characteristics, except for the branchiness ratio, quite substantially different mortality rates are obtained. Note that the branchiness ratio of the oil of Example 25 is 1.49 as compared to the branchiness ratio of 2.85 in the oil of Example 12, although these oils have substantially the same bicyclo ratio of 0.87 versus 0.72, and very similar boiling ranges. Note that the oil of Example 25 has a mortality activity against larvae of only 27% as compared to 79% in Example 12, and a mortality rate with respect to pupae of 93% as compared to 100%. At 1.25 gallons per acre, the pupae mortality rate for Example 25 was only 74% as compared to 96% for Example 12. Similarly, comparing the oil of Example 26 with the oil of Example 13, the branchiness ratio of 1.34 is compared to a branchiness ratio of 3.26. The activity is 27 and 47% for the oil of Example 26 as compared to 76 and 100% for the oil of Example 13.

The branchiness ratio adverted to above in Tables I and II was determined by NMR (nuclear magnetic resonance) analysis. The NMR analysis of Examples 6 through 9 is shown below in Table III.

TABLE III.—NMR ANALYSIS—PERCENT OF TOTAL HYDROGEN IN COMPOUNDS

| | Example | | | |
|---|---|---|---|---|
| | 6 | 7 | 8 | 9 |
| Functional Group | Lab. No. | | | |
| | 2994 | 2995 | 2996 | 2997 |
| Paraffinic $CH_3$ | 62.6 | 66.7 | 68.6 | 63.4 |
| Paraffinic $CH_2$ | 23.8 | 20.0 | 18.8 | 20.0 |
| Paraffinic CH and $C=C-CH_3$ | 9.8 | 8.5 | 8.7 | 10.0 |
| $C=C-CH_2$ and $C=C-CH$ | 3.3 | 4.3 | 3.1 | 5.3 |
| $C=CH$ | 0.5 | 0.5 | 0.8 | 1.3 |
| | 100.0 | 100.0 | 100.0 | 100.0 |
| Branchiness ratio, Par $CH_3$/Par $CH_2$ | 2.63 | 3.33 | 3.65 | 3.17 |

Residual effectiveness

It is stressed that the very effective pupicidal action of the present oils, coupled with their resistance to evaporation, results in a killing of those larvae which survive long enough to become pupae. Thus, the life cycle is broken.

To establish the residual effectiveness of the present oils, the following tests were made. The oils were pipetted onto the surface of water in beakers at the rate of 5 gallons per acre and *C. fatigans* pupae were introduced into the separate beakers at various times up to 8 days after the oil was deposited on the water surface. The oils used in these tests are shown in Table I.

TABLE IV.—RESIDUAL TOXICITY TO *Culex fatigans* PUPAE

| | Lab. No. | Boiling Range | Age of Film, days | | | | | | | |
|---|---|---|---|---|---|---|---|---|---|---|
| | | | 1 | 2 | 3 | 4 | 5 | 6 | 7 | 8 |
| Example: | | | | | | | | | | |
| 6 | 2994 | 425+ | 2 | 4 | 1 | 2 | | | | |
| 7 | 2995 | 500+ | 41 | 44 | 1 | 5 | | | | |
| 8 | 2996 | 550+ | 22 | 48 | 8 | 5 | | | | |
| 9 | 2997 | 575+ | 100 | 99 | 96 | 92 | 99 | 96 | 83 | 68 |
| No. 2 diesel fuel | | | 3 | 4 | 3 | 0 | 0 | 1 | 0 | 0 |

Note that No. 2 diesel fuel, even after only 24 hours, is virtually ineffective against the pupae. The claimed oils (which boil higher than 525° F.) are quite effective up to two days after deposition, and the 575° F.+ material is still reasonably effective after 8 days. For this reason, the 575° F.+ fraction is the preferred oil for use in controlling mosquito proliferation.

The present invention has been shown by field tests to be quite effective. The oils of Examples 7 and 9 were tested in Galveston County, Texas, in comparison with diesel fuel. The results are shown in Table V.

TABLE V.—FIELD TESTS (*Culex fatigans*)

| | Lab. No. | Rate, gal./acre | Larvae/dip before | Larvae/dip 24 hrs.* |
|---|---|---|---|---|
| Example: | | | | |
| 7 | 2995 | 2 | 175–200 | 5.3 |
| 9 | 2997 | 2 | 175–200 | 0.3 |
| Diesel fuel | | 10 | 175–200 | 30.0 |

*24 hours after deposition of the oil.

Note that although the diesel fuel was applied at a rate five times as great as the alkylate oils, the 500° F.+ oil of Example 7 left only one-sixth as many living larvae as did diesel fuel, and the 575° F.+ oil of Example 9 left only one-hundredth as many living larvae as did the diesel fuel.

Having disclosed my invention, I claim:
1. A method of controlling mosquito proliferation which comprises
   applying to the surface of a mosquito breeding pond at the rate of about 2.5 gal./acre of pond surface a mosquito control oil consisting essentially of a substantially paraffinic mixture boiling (ASTM–D86) within the range from 525° F. to 730° F. and having a 50% point of at least 575° F. but no greater than 650° F., having a branchiness ratio from 2.4 to 3.9, and consisting essentially of a highly paraffinic mixture of hydrocarbons of the formulae:

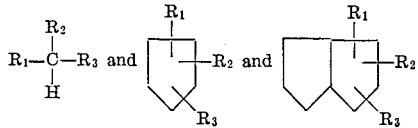

wherein $R_1$, $R_2$ and $R_3$ are highly branched iso-paraffinic substituents and wherein the total number of carbon atoms in each compound is within the range from $C_{18}$ to $C_{28}$.

2. A method in accordance with claim 1 wherein the mixture boils within the range from about 550° F. to about 700° F.

3. A method in accordance with claim 1 wherein the branchiness ratio is at least 2.6.

4. A method in accordance with claim 1 wherein the mixture has a boiling range ASTM–D86 substantially as follows:

| | |
|---|---|
| IBP | 571 |
| 5% | 591 |
| 50% | 615 |
| 95% | 683 |
| FBP | 683 |

References Cited

UNITED STATES PATENTS 3,133,975   5/1964   Brewer et al. ____ 260—683.46

OTHER REFERENCES

Ong, E.R., Chemistry and Uses of Pesticides, Reinhold Publishing Corporation, New York., 1956, pp. 101, 102.

FRANK CACCIAPAGLIA, JR., Primary Examiner

J. V. COSTIGAN, Assistant Examiner

U.S. Cl. X.R.

208—2; 424—355